March 11, 1958     W. K. MacADAM     2,826,637
AUTOMATIC LEVEL EQUALIZER
Filed Nov. 14, 1952     2 Sheets-Sheet 1
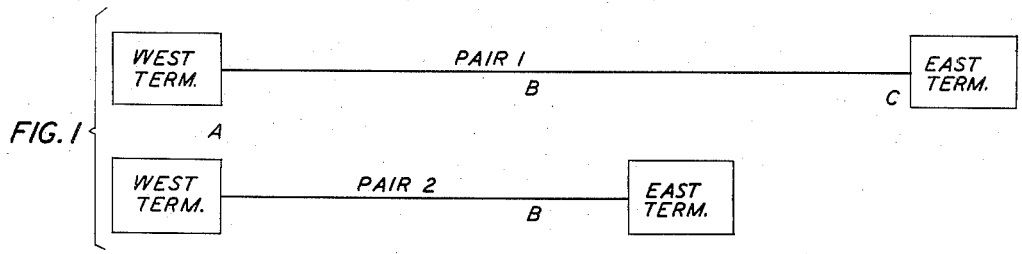
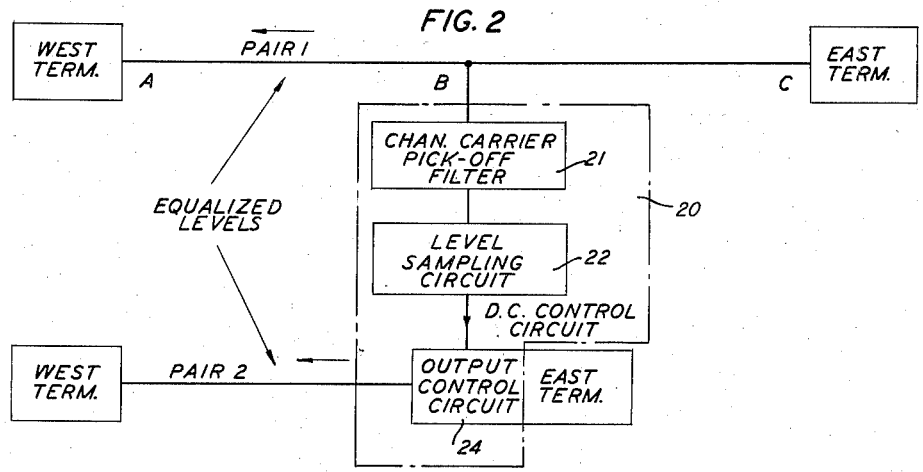
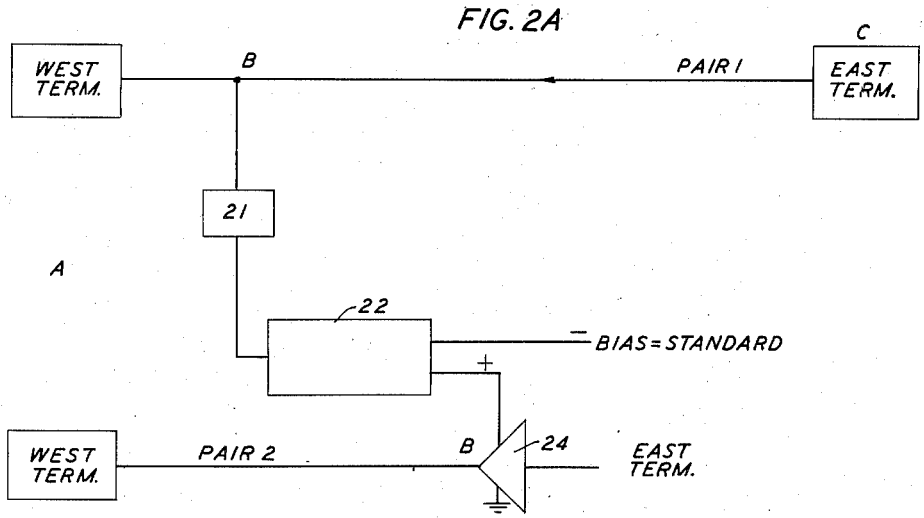
INVENTOR
W. K. MAC ADAM
BY Charles Baraff
AGENT March 11, 1958 W. K. MacADAM 2,826,637
AUTOMATIC LEVEL EQUALIZER
Filed Nov. 14, 1952 2 Sheets-Sheet 2
*FIG. 2B*
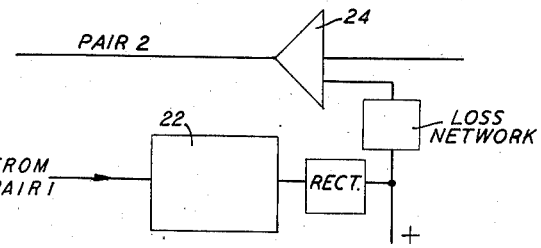
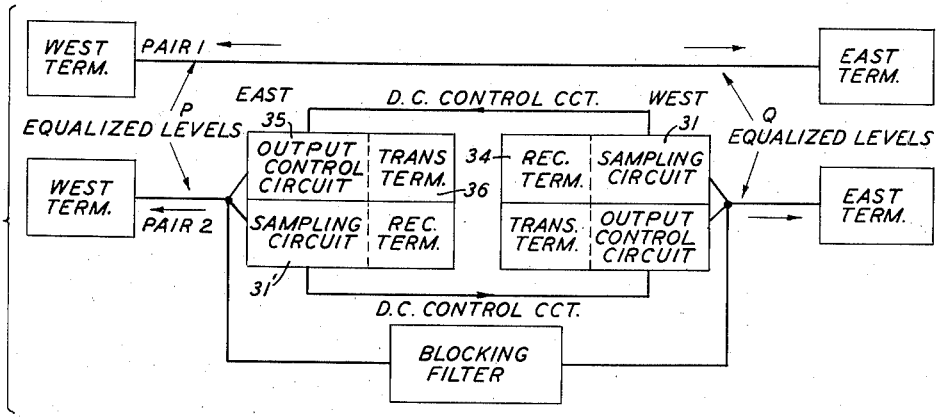
*FIG. 3*
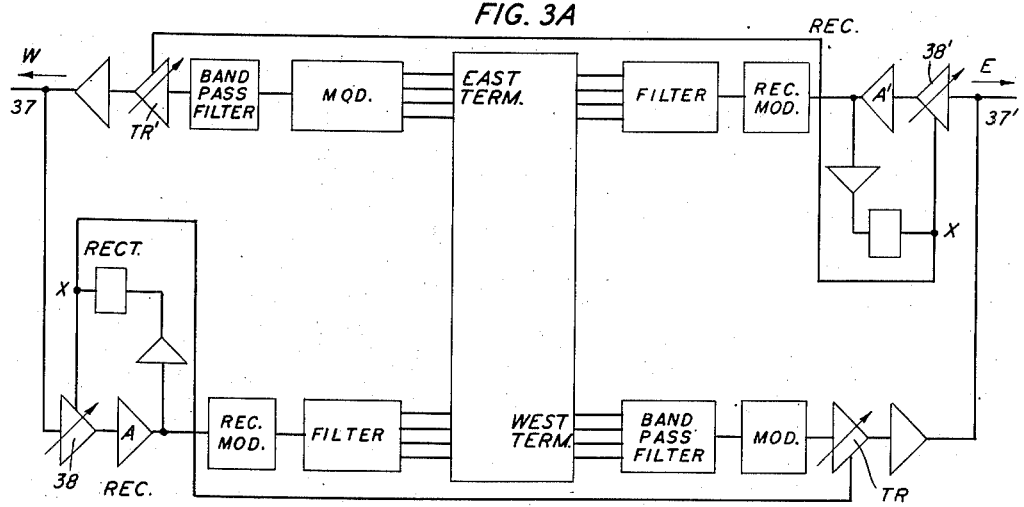
*FIG. 3A*
INVENTOR
W. K. MAC ADAM
BY Charles Baraff
AGENT

United States Patent Office 2,826,637
Patented Mar. 11, 1958

2,826,637

AUTOMATIC LEVEL EQUALIZER

Walter K. MacAdam, Denver, Colo., assignor to American Telephone and Telegraph Company, a corporation of New York Application November 14, 1952, Serial No. 320,559

4 Claims. (Cl. 179—15)

This invention relates to multichannel carrier systems and more particularly to automatic level equalization therefor.

An object of the invention is to overcome level differences between carrier channels operated on different pairs.

Another object is to reduce level differences between like channels transmitted in one direction to thereby lower the cross-talk.

A feature of the invention is a circuit which samples the carrier amplitude or level at one point of a pair, preferably at a channel dropping point, and adjusts the channel level in another pair to equality therewith for the purpose of maintaining equal levels in one direction of transmission regardless of weather changes.

Another feature of the invention is a multichannel carrier system having a carrier filter and a level sampling circuit connected between adjacent pairs, which responds to losses in one pair produced by weather changes, to reduce the level differences and maintain equal levels for one direction of transmission.

Another feature of the invention is a two-way multichannel carrier system operating over pairs, wherein level differences between pairs are reduced and amplitudes at corresponding points maintained equal by a level sampling circuit in one pair, which controls the outgoing level of a channel therein in accordance with the received level and thereby reduces cross-talk.

In accordance with an embodiment of the invention, channels of a multichannel carrier system are transmitted on separate pairs and maintained at equal levels for one direction of transmission by a level sampling circuit operating on carrier power and providing a signal voltage to reduce the level differences. These differences may normally exist between two pairs at a channel dropping point due to changing weather conditions beyond the point and the level sampling circuit may be connected between pairs having coterminus terminals at one end only. In the case where pairs are coterminus at both ends, automatic level equalization may be provided at an intermediate station or terminal by level sampling circuits in one pair, which controls the outgoing level of a channel in accordance with the received level to reduce cross-talk.

Fig. 1 is an explanatory schematic of multichannel pairs with level differences engendered by changing weather conditions;

Fig. 2 is a schematic diagram of an automatic level equalization circuit in accordance with the invention operating between such pairs;

Figs. 2A and 2B are circuit diagrams of alternative forms of this circuit;

Fig. 3 is a block schematic diagram of another form of automatic equalization circuit associated with an intermediate station located in one pair only; and Fig. 3A is a schematic circuit diagram of a modified form of the circuit shown in Fig. 3.

Fig. 1 represents an explanatory schematic of two similar carrier channels operated on different pairs, respectively, to illustrate the nature of the level differences developed therebetween.

Pairs 1 and 2 are coterminus at one end only, for example, at the west terminal A of the line. Pair 1 extends from A to C, whereas pair 2 extends only from A to an intermediate point B.

Since the west terminals are coterminus and since they are assumed to transmit at the same fixed levels, it is obvious that the carrier levels at corresponding points between A and B will be the same regardless of changes in line loss due to weather.

On the other hand, this is not the case for carrier levels transmitted from the east terminals toward the west. Even if the transmitting level of the east terminal on pair 2 were reduced so as to equal the level at point B on pair 1 for one weather condition, this equality could not be maintained, as the levels would differ considerably as the weather changed in the region B—C from dry to wet or sleet conditions. Such level changes would result in impairment of cross-talk performance from the higher level to the low level channel. For this reason, it has been customary heretofore to provide a repeater in pair 1 at B whereby the levels are equalized and cross-talk suppressed.

Fig. 2 shows a circuit in accordance with the invention for automatically equalizing the levels in the aforementioned pairs (Fig. 1) and thereby dispensing with the provision of an additional repeater.

At point B, the automatic equalization circuit 20 serves to effect an adjustment in the output of the east terminal located in pair 2 whereby the levels (E—W) are maintained equal for all weather conditions. The resulting savings may be considerable particularly where a number of like channels on other pairs are involved, extending from A to C or to any points beyond B. It should be appreciated that the automatic equalization circuit is equally applicable to repeaters as well as to terminals.

As shown in Fig. 2, the automatic equalization circuit 20 comprises a carrier pick-off filter 21 and a level sampling circuit 22 bridged or otherwise connected to the through carrier pair 1 at intermediate point B. The sampling circuit measures continually or periodically the levels in pair 1, either of pilot frequencies or transmitted carrier picked off by filter 21 at location B.

The sampling circuit 22 at its output provides a signal which controls the carrier output level of the east terminal on pair 2, so that line levels are kept approximately equal regardless of changes in weather conditions.

This control can be exercised by measuring the level in pair 1 with respect to a "bias-standard," as shown in Fig. 2A. Here the difference between the carrier level and the standard is utilized in making corrective changes in the output of the east terminal of pair 2, i. e., by controlling the gain bias of its amplifier 24.

Fig. 2B shows an alternative control wherein the output of the sampling circuit 22 may be rectified and the resulting direct current signal may be applied to control a variable gain or loss network connected to transmitting amplifier 24.

Fig. 3 show a modified form of automatic equalization circuit. Here the level sampling is derived from a two-way terminal station arranged for dropping and reinserting one or more carrier channels and located at intermediate point B on pair 2. The dropped channels are blocked by the "blocking filter" which passes the through channels.

The pairs 1 and 2 are coterminus at their east and west terminals, respectively, and pair 2 has a two-way terminal station located at intermediate point B. Equalized levels are to be established at the points indicated by arrows P, Q.

Here a sampling circuit 31 is connected into receiving terminal 34 to provide a direct current control as aforementioned, which is then applied to the output 35 of transmitting terminal 36 for automatic level equalization. Thus the level of the outgoing signals from the intermediate point is made the same as the level of signals then present at the same point on pair 1.

A similar sampling circuit 31' operates similarly for the opposite direction, as indicated.

The terminal stations shown in Fig. 3 may be of well-known construction utilized in multichannel carrier systems, each being provided with a receiving and transmitting terminal for two-way operation.

Fig. 3A illustrates an arrangement in which the controlled quantity is derived from the automatic volume regulation equipment usually provided in multi-channel carrier systems, thus eliminating the need for channel carrier pick-off filters. More specifically, the terminals of Fig. 3 may be of the form disclosed in the multichannel open-wire carrier system disclosed in the U. S. application Serial No. 264,098 of R. S. Caruthers and E. K. Van Tassel, filed December 29, 1951, now Patent 2,695,927, November 30, 1954. In such a system, the level sampling can be expeditiously obtained from a regulated amplifier in the group receiving circuit or from the regulated amplifier of the repeater station disclosed therein as illustrated in Fig. 3A.

As shown in Fig. 3A the total carrier power received from the openwire line 37 is amplified by a receiving amplifier A whence a portion thereof is rectified and sampled at X. The direct current control thus obtained is applied to the regulating amplifier and to the transmitting amplifier TR in the manner previously described for automatic equalization of levels. For the opposite direction of transmission, a similar level equalization circuit is used, as shown in Fig. 3A.

In the event that the sampling circuits are interrupted as a result of line trouble or similar conditions, it may be desirable to incorporate known level holding circuits which will permit only gradual level changes resulting from line-loss variations to operate the sampling circuit.

It should be appreciated that other forms of level sampling and control circuits may be used without departing from the spirit of the invention. For example, the control voltages may be derived from samples taken individually from separate pairs and appropriately combined in a network for reducing the level differences aforementioned.

What is claimed is:

1. An automatic level equalization circuit to reduce cross-talk between pairs comprising carrier terminal stations and a pair of lines of unequal lengths, each line connecting a pair of terminal stations for two-way transmission of an individual carrier therebetween, a receiver having a channel carrier pick-off filter, means for sampling the amplitude of carrier waves on one of said lines, a transmitter connected to the other line at a point coterminus with said receiver, and means for adjusting the output of said transmitter in accordance with said sampling current to maintain equal levels at like points on said lines located between said receiver and coterminus terminal stations.

2. An automatic equalization circuit for multichannel carrier systems comprising two pairs of unequal lengths having coterminus terminals at one end only, a channel carrier pick-off filter for selecting a carrier frequency at an intermediate point from one pair, a level sampling circuit connected to said selecting means, a rectifier in said sampling circuit and providing a control current, a terminal station in said second pair at said intermediate point, and means for applying said control current to the last-named terminal station, whereby the levels of said lines are equalized for one direction of transmission regardless of changes in weather conditions.

3. The structure of claim 2, wherein said control current is derived from the difference in carrier amplitudes on said pairs at the intermediate point and a variable gain amplifier in the last-named terminal station having its gain bias controlled by said difference.

4. In a carrier transmission system operating over transmission lines of different length but adjacent in their coextensive region, a transmitter at that terminal of the longer line remote from the shorter line and transmitting signals on a carrier of predetermined frequency, a transmitter at that terminal of the shorter line intermediate the terminals of said longer line and transmitting signals on a carrier of said predetermined frequency, means for sampling the amplitude of the carrier waves on said longer line at a point thereon coterminus with said transmitter of the shorter line, means responsive to the deviation of the sampled amplitude of the carrier waves on said longer line from a predetermined standard for regulating the amplitude of the carrier output level of said transmitter on said shorter line to maintain equal the levels at said predetermined carrier frequency in the coterminus sections of said two lines thereby reducing cross talk between said lines at said predetermined carrier frequency.

References Cited in the file of this patent

UNITED STATES PATENTS

| | | |
|---|---|---|
| 1,676,627 | Black | July 10, 1928 |
| 2,097,507 | Barney | Nov. 2, 1937 |
| 2,300,415 | Green | Nov. 3, 1942 |